May 16, 1961 R. L. FARROW ET AL 2,984,517
TORSION BAR TAILGATE SUPPORT
Filed Nov. 18, 1959 4 Sheets-Sheet 1
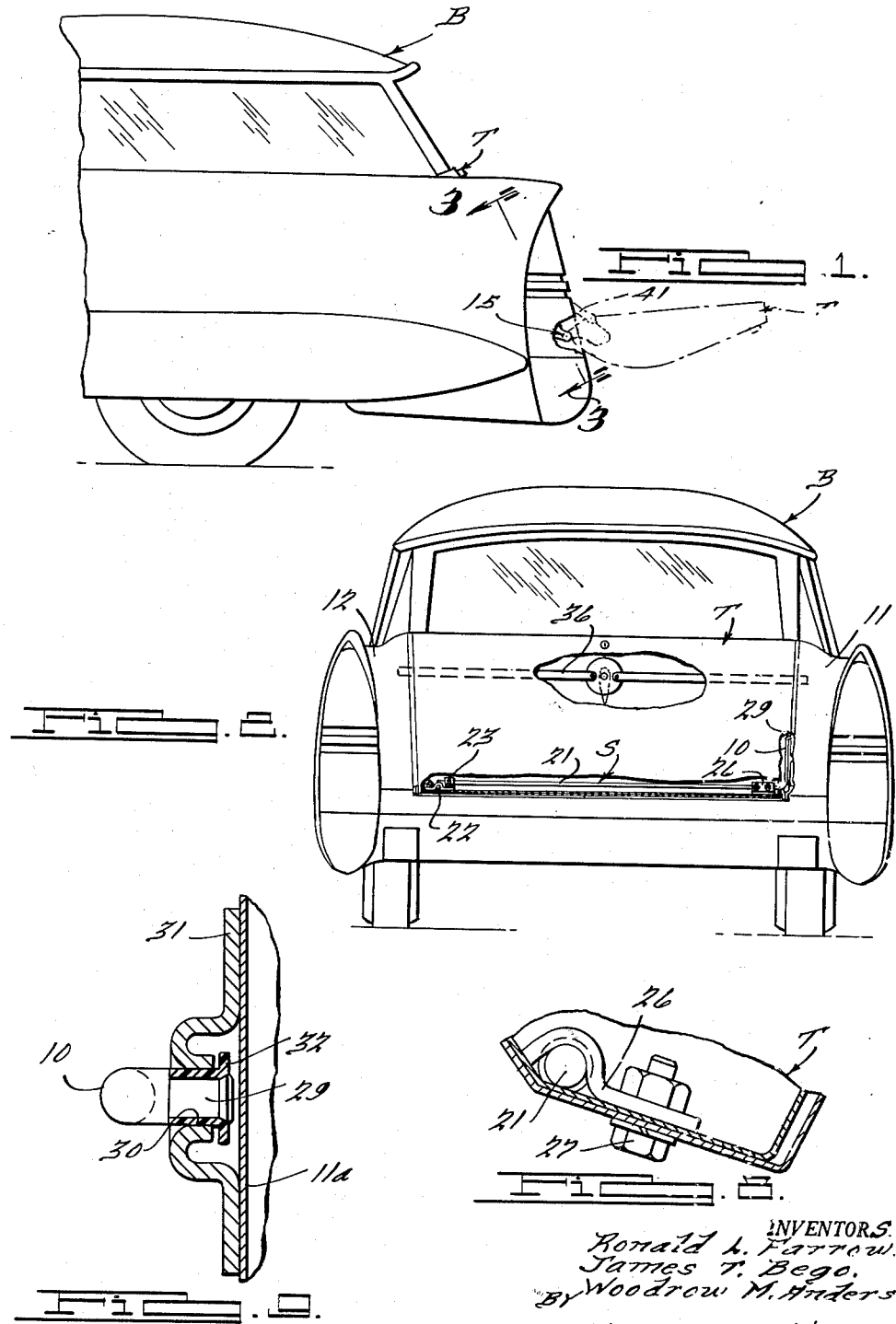
INVENTORS.
Ronald L. Farrow.
James T. Bego.
BY Woodrow M. Anderson
Harness and Harris
ATTORNEYS.

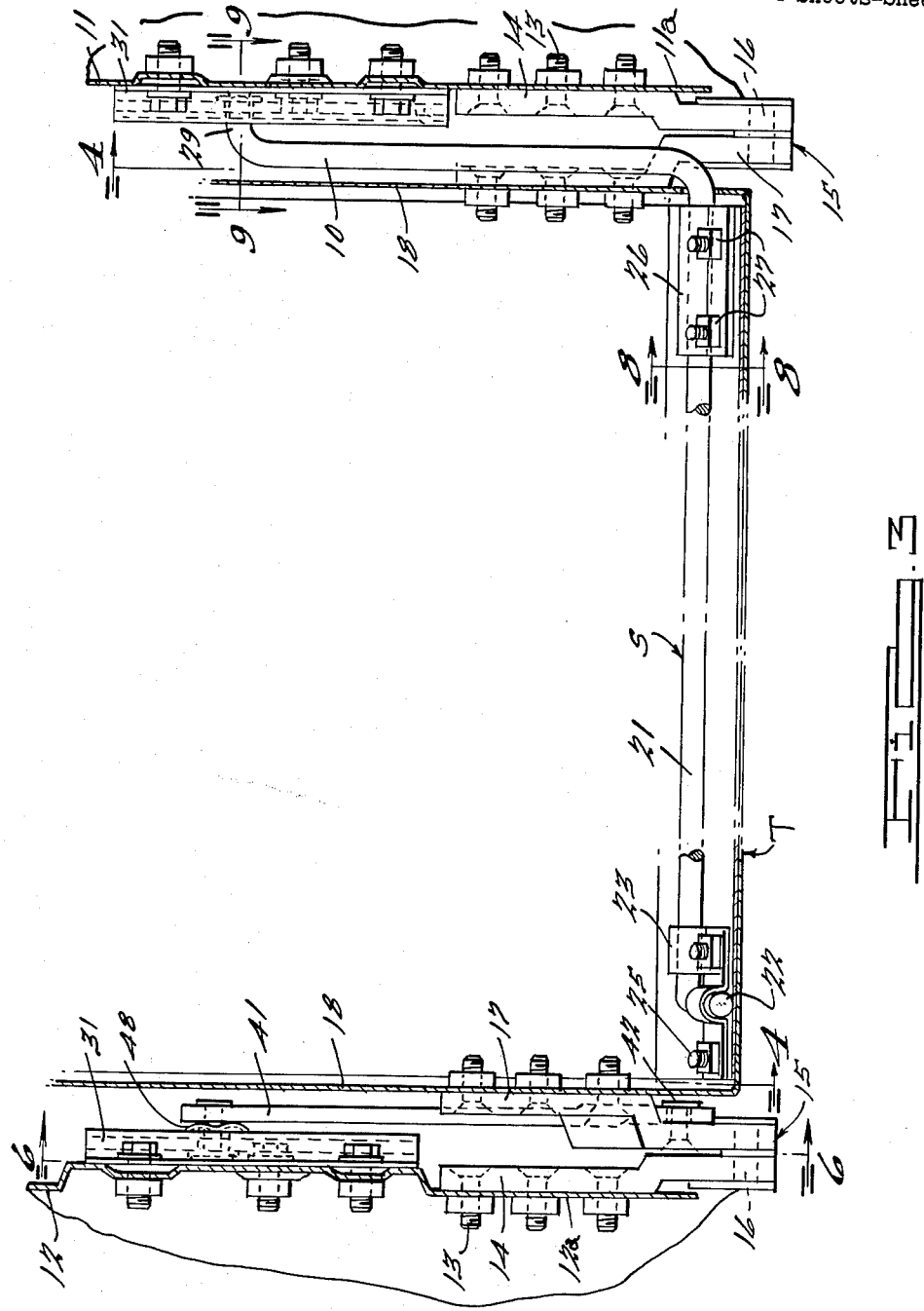

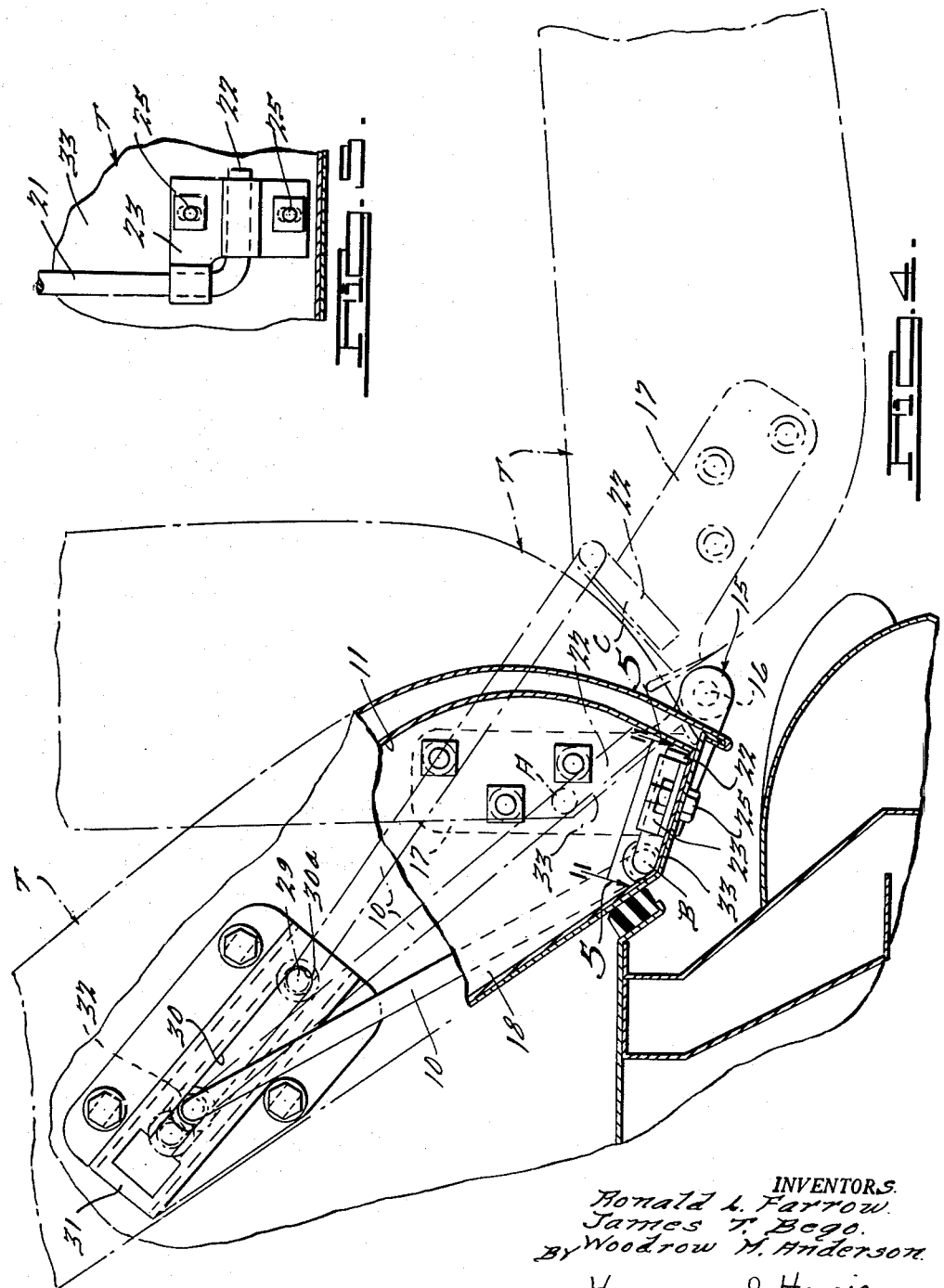

May 16, 1961
R. L. FARROW ET AL
2,984,517
TORSION BAR TAILGATE SUPPORT
Filed Nov. 18, 1959
4 Sheets-Sheet 4
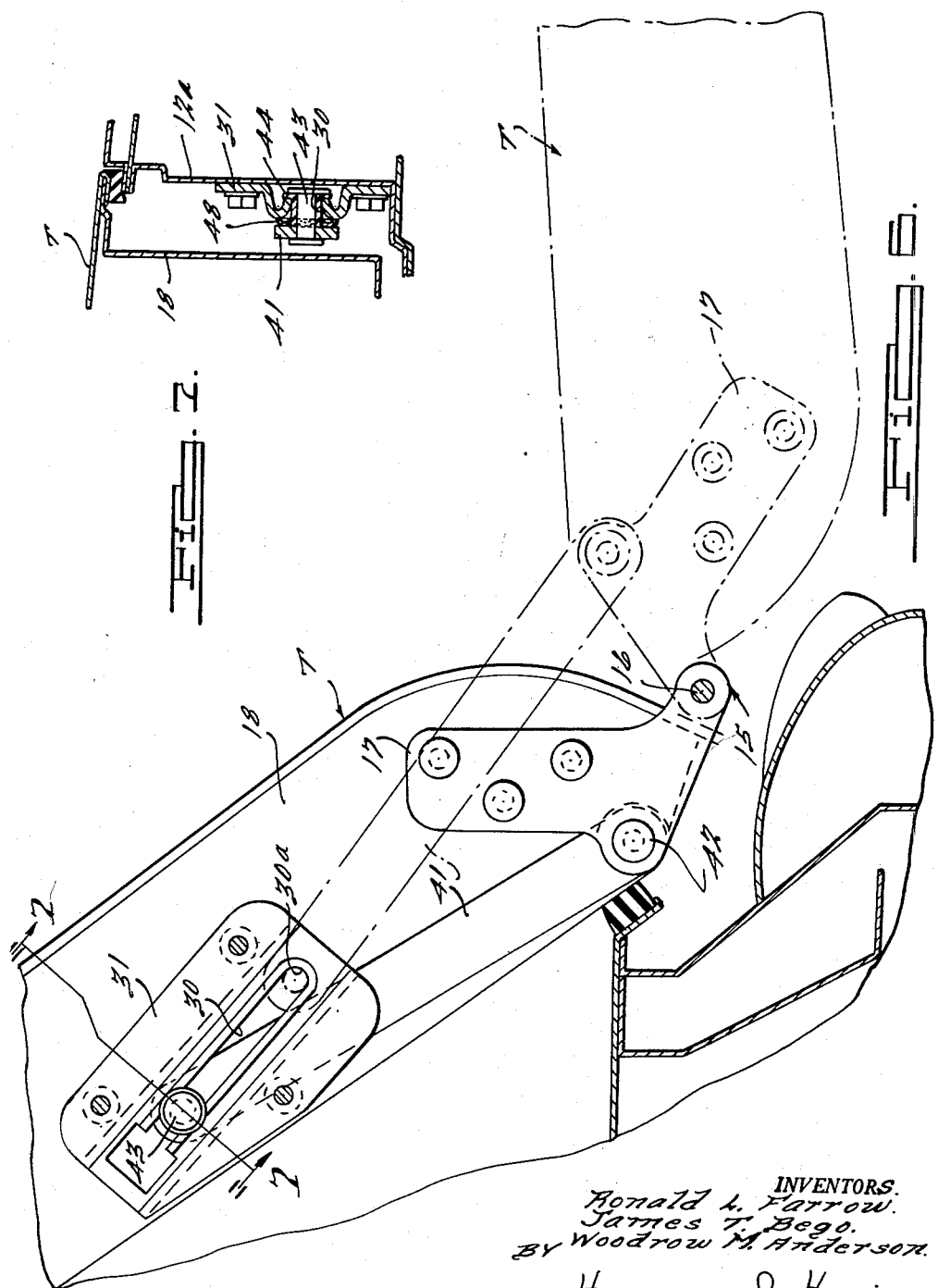
INVENTORS.
Ronald L. Farrow.
James T. Bego.
BY Woodrow M. Anderson.
Harness and Harris
ATTORNEYS.

United States Patent Office 2,984,517
Patented May 16, 1961

2,984,517
TORSION BAR TAILGATE SUPPORT
Ronald L. Farrow, St. Clair Shores, James T. Bego, Pontiac, and Woodrow M. Anderson, Wayne, Mich., assignors to Chrysler Corporation, Highland Park, Mich., a corporation of Delaware Filed Nov. 18, 1959, Ser. No. 853,960
7 Claims. (Cl. 296—57)

This invention relates to torsion bar hinge mechanisms and particularly to torsion bar hinge mechanisms wherein the crank end of the torsion bar serves a dual function in that it controls stressing of the torsion bar and cooperates with a slotted mounting bracket to also provide a movement limiting linkage for the pivotally mounted member actuated by the torsion bar. This invention finds a preferred application in the mounting of tailgates on station wagon-type passenger vehicles and on trucks or other commercial-type vehicles that utilize tailgates.

It is a primary object of this invention to provide a torsion bar spring means for a hingedly mounted closure member having a crank portion that is adapted to operate as a movement limiting and supporting means for the hinged closure member.

It is another object of this invention to provide a torsion bar spring means for a hingedly mounted closure member wherein the torsion bar has an end portion thereof arranged to provide a stress controlling crank for the torsion bar as well as a movement limiting link support for the closure member.

It is another object of this invention to provide a torsion bar spring means for a hingedly mounted closure member wherein the torsion bar has an end portion thereof arranged to provide a stress controlling crank for the torsion bar as well as a movement limiting link support for the closure member and wherein the torsion bar spring is arranged to counterbalance the weight of the closure member in both the open and closed positions of the closure member.

Other objects and advantages of this invention will be readily apparent from a consideration of the following description and the related drawings wherein:

Fig. 1 is a fragmentary side elevational view of the rear portion of a motor vehicle having a tailgate that embodies this invention;

Fig. 2 is a rear end elevational view of the vehicle structure shown in Fig. 1, with portions broken away to more clearly show the invention;

Fig. 3 is an enlarged fragmentary vertically extending sectional elevational view of the tailgate torsion bar structure embodying this invention, the view being taken substantially along the line 3—3 of Fig. 1;

Fig. 4 is an enlarged fragmentary sectional elevational view of the right end portion of the tailgate torsion bar spring means, the view being taken along the line 4—4 of Fig. 3;

Fig. 5 is an enlarged fragmentary sectional elevational view of the anchored left end of the tailgate torsion bar spring, the view being taken along the line and in the direction of the arrows 5—5 of Fig. 4;

Fig. 6 is an enlarged sectional elevational view of the left end of the tailgate supporting hinge structure shown in Fig. 3, the view being taken along the line 6—6 of Fig. 3;

Fig. 7 is an enlarged fragmentary sectional elevational view of the upper end of the tailgate supporting hinge link at the left end of the tailgate, the view being taken along the line and in the direction of the arrows 7—7 of Fig. 6;

Fig. 8 is an enlarged fragmentary sectional elevational view of one of the torsion bar mounting clips, the view being taken along the line and in the direction of the arrows 8—8 of Fig. 3; and Fig. 9 is an enlarged fragmentary sectional elevational view of the slidably mounted free end of the torsion bar crank at the right end of the tailgate, the view being taken along the line and in the direction of the arrows 9—9 of Fig. 3.

The closure member specifically shown in the drawings to which this invention has been applied, is a vertically swinging tailgate T that is hingedly mounted at its lower edge on the rear end portion of the motor vehicle body B. Because of the size and weight of a motor vehicle tailgate it has been found expedient to provide some form of counterbalancing means for the hingedly mounted tailgate T so that it will be quite easy for either a child or an adult to effect swinging movement of the tailgate between its fully opened and fully closed positions with the exertion of a minimum amount of effort. Torsion bar springs, such as the spring generally denoted by the reference numeral S, have been found to provide a very economical and efficient counterbalance means for motor vehicle tailgate assemblies. By a novel manner of mounting and arranging the torsion bar spring S in the tailgate assembly T it has been found that the crank arm 10 of the torsion bar spring S can be utilized not only to control the stress developed in the spring S but to also provide a movement limiting link support for the hingedly mounted tailgate T. Accordingly, the crank arm 10 of the torsion bar spring S serves a dual function in that it provides for stress build-up in the spring S so that the tailgate assembly T will be counterbalanced in both its opened and closed positions and, furthermore, the torsion bar spring crank arm 10 provides a movement limiting tailgate supporting link when the tailgate T has been moved to its fully opened position (see Fig. 4).

It has been common practice in the past to utilize a pair of toggle links or hinge links located at opposite ends of the tailgate assembly T to provide the movement limiting link supports for the tailgate assembly when it is in its fully opened position. A hinge link 41 of this type is shown in Fig. 6. Because of the manner of forming and arranging the torsion bar spring crank end 10, it is possible, with the teachings of this invention, to eliminate the hinge link 41 that would normally be required at one end of the tailgate assembly T and to use the torsion bar spring crank end 10 for a hinge link as well as a stress crank, thereby reducing the cost of the tailgate assembly without eliminating any of the desired functions or structural advantages of prior assemblies. The specific details of construction relating to the novel tailgate torsion bar spring counterbalance means will now be described. Considering Figs. 2, 3, 4 and 6 in particular, it will be noted that the rear end portion of the vehicle body B has quarter panels at its right and left sides which have been denoted 11 and 12, respectively. Each of these quarter panels 11 and 12 provide side wall portions 11a and 12a that have mounted thereon by means of bolts 13, one strap 14 of a strap hinge assembly generally denoted by the numeral 15. Each hinge strap 14 is connected by pivot pin means 16 to a second hinge strap portion 17 that is detachably or otherwise fixedly connected to the adjacent side edge or face 18 of the tailgate assembly T. The hinge pins 16 extend in substantially a horizontal direction and, therefore, the tailgate T can be pivoted from its closed, substantially vertically extending position to a fully opened (see Figs.

1, 4 and 6) position wherein the tailgate extends in a substantially horizontal plane and projects rearwardly from the rear end of the vehicle body B. The specific type of hinge means 15 utilized to connect the tailgate T to the vehicle body B does not form a part of the invention herein claimed as it is thought to be obvious that other types of hinge means may be substituted for the specifically disclosed hinge means 15 without influencing or altering the manner of operation of the novel torsion bar spring means S.

The torsion bar spring means S, that embodies this invention, comprises an elongated, rod-like, body portion 21 that has one bent end portion that is anchored to the tailgate T by a clamp means 23 that is clearly shown in Fig. 5. To provide for ready removal of the torsion bar spring S from the tailgate assembly T, the clamp means 23 is mounted on the tailgate T by means of bolt and nut connectors 25. The opposite end of the torsion bar body portion 21 is connected to the tailgate T by a detachable bearing plate 26 that is connected to the tailgate T by means of bolt and nut connectors 27. Projecting at right angles to the torsion bar body portion 21 at the end adjacent the bearing plate 26 is the torsion bar crank portion 10. The crank portion 10 has its free end bent at substantially right angles so as to provide an offset finger portion 29 which is adapted to be slidably mounted in a slot 30 in the bracket plate 31. To facilitate sliding of the crank end portion 29 in the bracket plate slot 30 a plastic sleeve 32 (see Fig. 9) is rotatably mounted on the crank portion 29. The plastic sleeve 32 provides a permanently lubricated, sound insulating, friction free connection between the crank end 29 and the bracket slot 30.

Now considering Fig. 4 in particular, it is thought that the manner in which the torsion bar spring S is utilized to counterbalance the tailgate T in both its open and closed positions will be apparent. In its normal, unstressed shape the torsion bar S is of substantially U-shape with the crank arm 10, the body portion 21 and the anchor end 22 all lying in the same plane as indicated by the letter A showing the position of these parts when the tailgate T is in a substantially vertical position. With the torsion bar spring S connected to the bottom wall portion 33 of the tailgate T and the crank end portion 29 mounted in the body slot 30 and the tailgate T extending in the substantially vertical position indicated as position A in Fig. 4, the torsion spring crank arm 10 is coplanar with its body portion 21 and its anchor end 22. Under such circumstances there is no prestress in the torsion bar spring S. Now if the tailgate T is moved forwardly or counterclockwise to its closed position, indicated by the letter B, it will be noted from Fig. 4 that the anchored end 22 of the torsion bar spring S now takes a position wherein the crank end 22 is no longer coplanar with the crank arm 10. Under such circumstances there will be a prestress developed in the torsion bar spring S which will tend to swing the tailgate T clockwise about its pivot pins 16 towards its open or substantially vertical position. Accordingly, it is though to be obvious that on release of the tailgate latching means 36 (see Fig. 2) the torsion bar spring S will automatically act to urge the tailgate towards its substantially vertically extending, partially open, position.

As the tailgate T is moved from the substantially vertical position to its fully opened, horizontally extending, position, indicated by the letter C in Fig. 4, it will be noted that the torsion bar anchor end 22 is moved to the postion where it is no longer coplanar with the spring body portion 21 and end portion 10 and under such circumstances a prestress has been developed in the spring S which acts to urge the tailgate T upwardly towards the substantially vertically extending, partially open, neutral position indicated by the letter A. Accordingly, the spring S will exert a major portion of the force required to lift the tailgate T from its fully opened position to its vertically extending position and, therefore, only a small amount of physical effort need by exerted by the person who attempts to lift the tailgate T from its fully opened position to its closed position.

It will be further noted from Fig. 4 that when the tailgate is in its fully opened position, indicated by the letter C, that the bent end 29 of the crank portion 10 is seated in the neck portion 30a at the lower end of the slot 30 of the body-mounted bracket plate 31 and under such circumstances the torsion bar crank end 10 acts as a movement limiting support link for the tailgate T in addition to providing the prestress control means for the torsion bar spring S. It is, therefore, obvious that the crank arm 10 of torsion bar spring S serves a dual function when it is incorporated in a tailgate assembly in the manner herein disclosed. Depending on the weight of the tailgate T it may be necessary to supplement the supporting action of the crank arm 10 with a single support link 41 at the other end of the tailgate T. In the drawings, note Figs. 3, 6 and 7, it will be seen that a conventional type of movement limiting support link 41 has been applied to the left end of the tailgate T. Support link 41 has its lower end pivotally connected by pin means 42 to the hinge strap 17 mounted on the end face 18 of the tailgate T. The upper end of the support link 41 carries a pin 43 that is slidably mounted in a slot 30 in a bracket plate 31 that is identical to the plate 31 utilized for mounting the torsion bar crank arm end 29 on body member 11a at the right end of the tailgate T. As was the case with the crank arm end 29, the pin 43 on the upper end of the supporting link 41 carries a flanged plastic sleeve 44 to provide a permanently lubricated, sound insulated, friction free, slidable connection between the pin 43 and the slot 30 in bracket plate 31. A friction washer 48 of the Belleville type is carried by the pin 43 to provide a means that tends to anchor the tailgate T in any selected position. When the tailgate T is in its fully opened, substantially horizontally extending position, the support link pin 43 is seated in the neck portion 30a at the lower end of bracket plate slot 30 so as to provide a rigid support for the tailgate T in its open position. It will be noted from the drawings that the bracket plates 31 at opposite ends of the tailgate T are identical even though the bracket plate at the right end of the tailgate T mounts the free end of the torsion bar crank arm 10 while the bracket plate 31 at the left end of the tailgate T mounts the slidable upper end of the pivoted support link 41. This utilization of the identical parts at opposite ends of the tailgate T provides a most economical construction and its advantages in both manufacture and assembly of the tailgate mechanism are thought to be obvious. The utilization of the torsion bar crank arm 10 as a pivoted support link as well as a spring stress controlling means for counterbalancing functions is another feature of this invention that is thought to be novel as well as of economical significance.

We claim:

1. In combination with a body having an opening therein, a closure member for said opening pivotally mounted on said body for movement between open and closed positions, a torsion bar counterbalance spring for said closure member having an elongated body portion mounted on said closure member and extending substantially parallel to the pivot axis for said closure member, said spring having one end anchored to said closure member and the other end formed with a crank portion, the free end of said crank portion being movably connected to said body by a movement controlling formation arranged to develop stress in said spring during movement of the closure member between said positions to cause it to urge said closure member from either its opened or its closed position towards a position therebetween, said crank portion engaging a stop when said closure is in fully open position to limit the opening movement thereof said stop cooperating with said crank so that said crank then acts as a tension strut between the body and closure member to provide a rigid support link for the closure member in said fully open position.

2. In combination with a body having an opening therein, a closure member for said opening pivotally mounted on said body for movement between open and closed positions, a torsion bar counterbalance spring for said closure member having an elongated body portion mounted on said closure member and extending substantially parallel to the pivot axis for said closure member, said spring having one end anchored to said closure member and the other end formed with a crank portion, the free end of said crank portion being slidably connected to a slot on said body arranged to develop stress in said spring during movement of the closure member between said positions to cause it to urge said closure member from either its opened or its closed position towards a balanced position therebetween, said crank portion seating in an end portion of said slot when said closure member is in fully open position to limit the opening movement thereof so that said crank portion then acts as a tension strut between the closure member and body to provide a rigid support link for the closure member in said fully open position.

3. In combination with a body having an opening therein, a closure member for said opening pivotally mounted on said body for movement between open and closed positions, a torsion bar counterbalance spring for said closure member having an elongated body portion mounted on said closure member and extending substantially parallel to the pivot axis for said closure member, said spring having one end portion anchored to said closure member and the other end portion formed with a crank portion, the free end of said crank portion being movably connected to a cam formation on said body arranged to develop stress in said spring during movement of the closure member between said positions to cause it to urge said closure member from either its opened or its closed position towards a position therebetween, said crank portion engaging a stop when said closure is in fully open position to limit the opening movement thereof so that said crank portion then acts as a tension strut between the closure member and body to provide a rigid support link for the closure member in said fully open position.

4. In combination with a motor vehicle body having an opening therein, a gate member for said opening pivotally mounted on said body for movement between open and closed positions, a torsion bar counterbalance spring for said gate member having an elongated body portion mounted on said gate member and extending substantially parallel to the pivot axis for said gate member, said spring having one end anchored to said gate member and the other end formed with an axially offset crank portion, the free end of said offset crank portion being movably connected to a camming slot on said body arranged to develop stress in said spring during movement of said gate member between said positions to cause it to urge said gate member from either its opened or its closed position towards a balanced position therebetween, said crank portion seating in an end portion of said slot when said closure member is in fully open position to limit the opening movement thereof so that said crank portion then acts as a tension strut between the body and the gate member to provide a rigid support link for the closure member in said fully open position.

5. In combination with a motor vehicle body having an opening therein, a gate member for said opening pivotally mounted on said body for movement between open and closed positions, a torsion bar counterbalance spring for said gate member having an elongated body portion mounted on said gate member and extending substantially parallel to the pivot axis for said gate member, said spring having one end anchored to said gate member and the other end formed with an axially offset crank portion, the free end of said offset crank portion being movably connected to a camming slot on said body arranged to develop stress in said spring to cause it to urge said gate member from either its opened or its closed position towards a balanced position therebetween, said crank portion seating in an end portion of said slot when said closure member is in fully open position to limit the opening movement thereof and to provide a rigid support link for the closure member in said fully open position, and a second rigid link having its opposite end portions pivotally connected to said gate member and said body respectively with one of the link end connections comprising a pin and slot connection wherein the pin seats on the end of the associated slot when said gate member is in fully open position to thereby provide a rigid support link for the gate member in said fully open position.

6. In a combination as set forth in claim 5 wherein the pin and slot connection at said one end of said second rigid link includes friction means that resist movement of the gate member.

7. In combination with a body member having an opening therein, a closure member for said opening pivotally mounted on a horizontal axis on said body member for movement between a substantially horizontal open position and a substantially vertical closed position, a torsion bar counterbalance spring for said closure member having an elongated body portion mounted on one of said members and extending substantially parallel to the pivot axis for said closure member, said spring having one end anchored to said one member and the other end formed with a crank portion, the free end of said crank portion being movably connected to a guideway on said other member arranged to develop stress in said spring during movement of the closure member between said positions so as to cause it to urge said closure member from either its opened or its closed position towards a position therebetween, said crank portion engaging a stop at one end of said guideway, when said closure is in fully open position, to limit the opening movement thereof so that said crank portion then acts as a tension strut between said members to provide a rigid support link for the closure member in said fully open position, and movable friction means connected between said members to resist relative movement between said members.

References Cited in the file of this patent

UNITED STATES PATENTS

| | | |
|---|---|---|
| 2,796,287 | Moyes | June 18, 1957 |
| 2,810,153 | Semar | Oct. 22, 1957 |
| 2,871,505 | Clark et al. | Feb. 3, 1959 |
| 2,916,763 | Wagner | Dec. 15, 1959 |